US010906658B2

(12) United States Patent
Long et al.

(10) Patent No.: US 10,906,658 B2
(45) Date of Patent: Feb. 2, 2021

(54) ENERGY STORAGE SYSTEM FOR A HYBRID POWER SYSTEM

(71) Applicants: Rolls-Royce North American Technologies Inc., Indianapolis, IN (US); Rolls-Royce Singapore Pte. Ltd., Singapore (SG)

(72) Inventors: Stephen Andrew Long, Carmel, IN (US); Andrew Bollman, Plainfield, IN (US); Michael Adam Zagrodnik, Singapore (SG); Chandana Jayampathi Gajanayake, Singapore (SG)

(73) Assignees: ROLLS-ROYCE NORTH AMERICAN TECHNOLOGIES INC., Indianapolis, IN (US); ROLLS-ROYCE SINGAPORE PTE. LTD., Singapore (SG)

(*) Notice: Subject to any disclaimer, the term of this patent is extended or adjusted under 35 U.S.C. 154(b) by 0 days.

(21) Appl. No.: 16/180,570

(22) Filed: Nov. 5, 2018

(65) Prior Publication Data

US 2020/0140101 A1    May 7, 2020

(51) Int. Cl.
*B64D 27/24* (2006.01)
*B64D 27/10* (2006.01)
(Continued)

(52) U.S. Cl.
CPC ........... *B64D 27/24* (2013.01); *B64D 27/10* (2013.01); *B64D 41/00* (2013.01); *F02C 7/26* (2013.01);
(Continued)

(58) Field of Classification Search
CPC ........ B64D 27/24; B64D 24/10; B64D 41/00; F02C 7/26
(Continued)

(56) References Cited

U.S. PATENT DOCUMENTS

| 6,037,749 A | 3/2000 | Parsonage |
| 9,611,049 B2 * | 4/2017 | Esteyne ................. H02J 7/342 |

(Continued)

FOREIGN PATENT DOCUMENTS

EP    3 044 846 B1    10/2019

OTHER PUBLICATIONS

"Advancing Electric Solutions," BAE Systems, dated 2017, pp. 1-12, published online by BAE Systems at URL http://www.hybridrive.com/, Endicott, NY.
(Continued)

*Primary Examiner* — Michael R. Fin
(74) *Attorney, Agent, or Firm* — Brinks Gilson & Lione

(57) ABSTRACT

Energy storage systems for aircraft and methods of operating the same are provided. The energy storage system may include a main battery, a propulsion power bus, a non-critical bus, a critical bus, and an engine starter bus. The propulsion power bus may be configured to convey electricity, which is supplied by the main battery, to an electric propulsion machine configured to provide propulsion for the aircraft. The non-critical bus may be configured to convey electricity to a hotel load on the aircraft. The critical bus may be configured to convey electricity, which is supplied by the main battery, to a critical load on the aircraft. The engine starter bus may be configured to convey electricity, which is supplied by the main battery, to an electric starter for a gas turbine engine, where the gas turbine engine is configured to power the electric propulsion machine.

19 Claims, 3 Drawing Sheets

(51) Int. Cl.
*B64D 41/00* (2006.01)
*F02C 7/26* (2006.01)
*H02J 1/00* (2006.01)
*B64D 27/02* (2006.01)

(52) U.S. Cl.
CPC .......... *H02J 1/00* (2013.01); *B64D 2027/026* (2013.01); *B64D 2221/00* (2013.01); *F05D 2220/323* (2013.01); *F05D 2260/42* (2013.01); *F05D 2260/85* (2013.01)

(58) Field of Classification Search
USPC .......................................................... 307/9.1
See application file for complete search history.

(56) References Cited

U.S. PATENT DOCUMENTS

| | | |
|---|---|---|
| 2009/0302153 A1 | 12/2009 | Matasso et al. |
| 2016/0036220 A1 | 2/2016 | Lacaux et al. |
| 2016/0236790 A1 | 8/2016 | Knapp et al. |
| 2017/0274847 A1 | 9/2017 | Shander et al. |
| 2019/0016470 A1* | 1/2019 | Huang .................. B64D 27/10 |

OTHER PUBLICATIONS

"ESS-3G-32K (Energy Storage System)," BAE Systems, earlier than Nov. 5, 2018, pp. 1-2, published online by BAE Systems at URL http://www.hybridrive.com/, Endicott, NY.

Extended European Search Report, issued in EP Application No. 19201278.9, dated Dec. 9, 2019, pp. 1-7, European Patent Office, Munich, Germany.

* cited by examiner

ENERGY STORAGE SYSTEM FOR A HYBRID POWER SYSTEM

TECHNICAL FIELD

This disclosure relates to aerospace propulsion systems and, in particular, to aerospace hybrid power systems.

BACKGROUND

Present hybrid aerospace propulsion systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
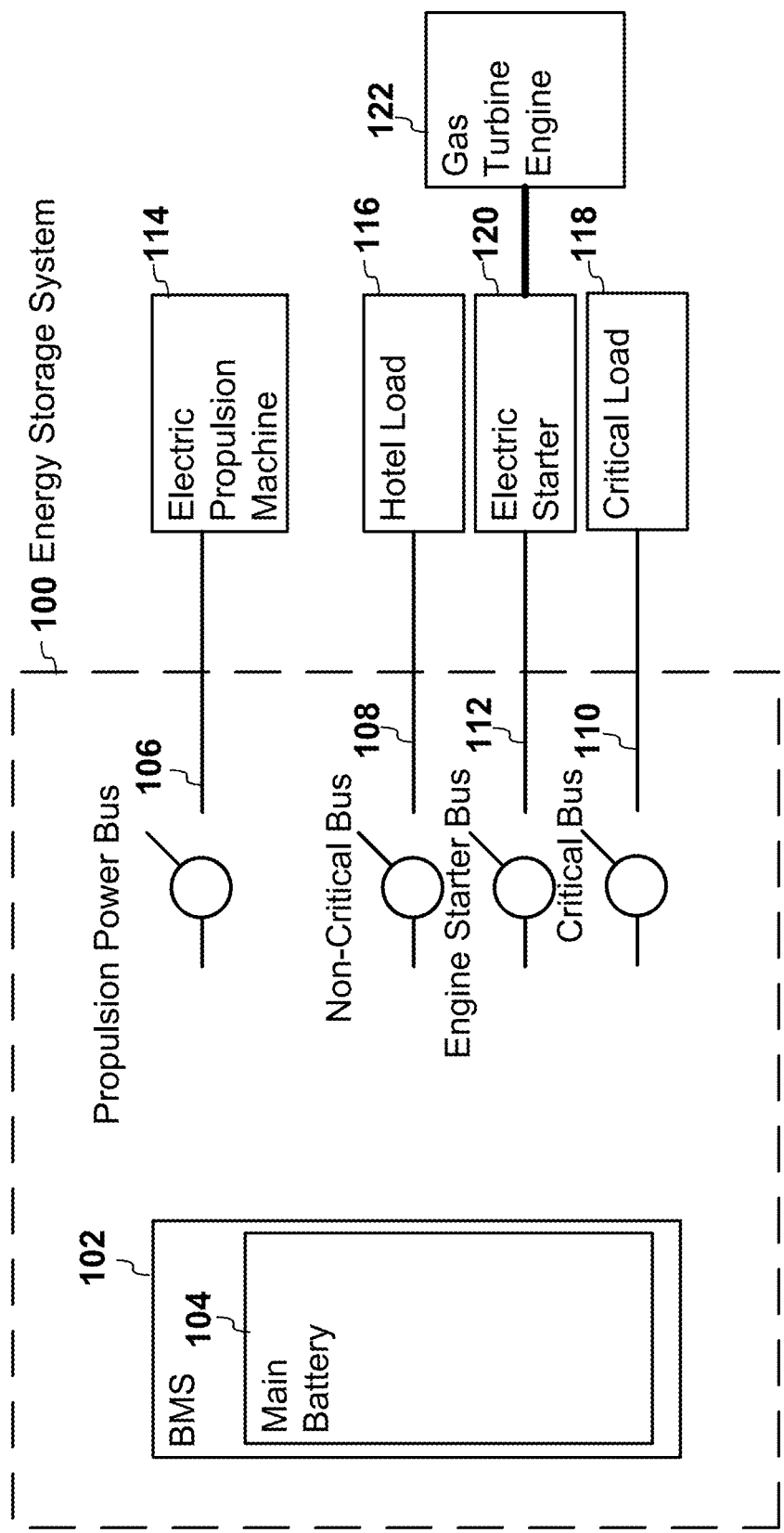
FIG. 1 is a schematic diagram of an example of an energy storage system for an aircraft.

In one example, an energy storage system for an aircraft is provided. The energy storage system includes a main battery, a propulsion power bus, a non-critical bus, a critical bus, and an engine starter bus. The propulsion power bus is configured to convey electricity, which is supplied by the main battery, to an electric propulsion machine configured to provide propulsion for the aircraft. The non-critical bus is configured to convey electricity to a hotel load on the aircraft, such as an entertainment system. The critical bus is configured to convey electricity, which is supplied by the main battery, to a critical load on the aircraft, such as avionics. The engine starter bus is configured to convey electricity, which is supplied by the main battery, to an electric starter for a gas turbine engine, where the gas turbine engine is configured to power the electric propulsion machine. The energy storage system, together with the engine starter and the gas turbine engine, make up a hybrid propulsion system for the aircraft.

In a second example, an electric circuit of an energy storage system is provided. The electric circuit includes a propulsion power bus, a non-critical bus, a critical bus, and an engine starter bus. The propulsion power bus is configured to provide a power signal from a main battery to an electric propulsion machine. The electric propulsion machine is configured to power a propulsor for an aircraft. The electric propulsion machine is further configured to be powered by a gas turbine engine. The non-critical bus is configured to provide electric power to a hotel load on the aircraft. The critical bus is configured to provide electric power supplied by the main battery to a critical load on the aircraft. The engine starter bus is configured to provide electricity supplied by the main battery to an electric starter, the electric starter is configured to startup the gas turbine engine.

In a third example, a method of operation is provided. Electrical power is supplied from a battery to an electric propulsion machine of an aircraft via a propulsion power bus. The electric propulsion machine provides propulsion for the aircraft and the electric propulsion machine is alternatively powered by a gas turbine engine. Electrical power is supplied from the battery to a hotel load on the aircraft via a non-critical bus. Electrical power is supplied from the battery to a critical load on the aircraft over a critical bus. The gas turbine engine may be started by providing electrical power from the battery to an electric starter via an engine starter bus, where the gas turbine engine powers the electric propulsion machine after the gas turbine engine is started.

The energy storage system (ESS) is for an aerospace application, and may supply output power to: a hybrid propulsion bus delivering power to a number of motor driven propulsors; a low voltage critical bus delivering power to engine and/or platform control systems, avionics, power electronic drive(s) for turbogenerator(s) and electric motor drive(s) for propulsors; a low voltage supply for non-critical loads, such as entertainment systems; a low voltage high current mode to deliver starting power for a turbogenerator. The EES may provide, for example, cell battery management system(s), a controller interface, electrical and thermal isolation between the low voltage buses and other buses to avoid faulted devices on other buses impacting the delivery of power to critical loads, protection devices, isolators, and contactors, an ability to be recharged from the propulsion bus, and/or an ability to be charged from ground.

FIG. 1 is a schematic diagram of an example of an energy storage system 100 for an aircraft. The energy storage system 100 may include a battery management system 102 comprising a main battery 104, a propulsion power bus 106, a non-critical bus 108, a critical bus 110, and an engine starter bus 112. The non-critical bus 108, the critical bus 110, and the engine starter bus 112 may be at a lower voltage than the propulsion power bus 106. For that reason, the non-critical bus 108, the critical bus 110, and the engine starter bus 112 may be referred to as the low voltage non-critical bus 108, the low voltage critical bus 110, and the low voltage engine starter bus 112, respectively. For example, the propulsion power bus 106 may be designed to be operated at 600 volts DC (Direct Current), whereas the non-critical bus 108, the critical bus 110, and the engine starter bus 112 may all be designed to operate at a lower voltage, such as 28 volts or 24 volts DC.

The propulsion power bus 106 is configured to convey electricity, which is supplied by the main battery 104, to an electric propulsion machine 114. The electric propulsion machine 114 is configured to provide propulsion for the aircraft. For example, the electric propulsion machine 114 may be configured to power a propulsor, such as a propeller, via a driveshaft and/or a drivetrain that includes a gear box. The propulsor may be any mechanical device that provides propulsion for the aircraft. The electric propulsion machine 114 may be any electric machine, such as an electric motor or an electric motor/generator, configured to provide propulsion for the aircraft.

The non-critical bus 108 is configured to convey electricity to a hotel load 116, such as an entertainment system, on the aircraft. In contrast, the critical bus 110 is configured to convey electricity, which may be supplied by the main battery 104, to a critical load 118 on the aircraft. Examples of the critical load 118 may include an engine control system, a platform control system, avionics, a power electronic drive for a turbogenerator, a controller for a propulsor, a controller for the electric propulsion machine 114, and/or any other electrical system that provides safety functionality or is required for continued safe operation of the aircraft (flight critical). Examples of the power electronic drive may include a lube oil pump, a cooling water pump, a hydraulic pump, and a fan motor.

The engine starter bus 112 is configured to convey electricity, which may be supplied by the main battery 104, to an electric starter 120 for a gas turbine engine 122. The gas turbine engine 122 is configured to power the electric propulsion machine 114. For example, the gas turbine engine 122 may be configured to power an electric generator (not shown), which in turn is configured to provide electric power to the electric propulsion machine 114. In such an example, the combination of the gas turbine engine 122 and the generator may be referred to as a turbogenerator. Alternatively or in addition, the gas turbine engine 122 may be mechanically coupled to the propulsor that the electric propulsion machine 114 is configured to mechanically power. For example, a clutch or a set of clutches may selectively couple the propulsor mechanically to the electric propulsion machine 114 or the gas turbine engine 122.

The electric starter 120 is different than the electric propulsion machine 114 that powers the propulsor. In addition, the electric starter 120 is different than any generator powered by the gas turbine engine 122 that powers the electric propulsion machine 114. As a result, the engine starter bus 112 and the electric starter 120 provide a mechanism for starting the gas turbine engine 122 even if a failure or a fault occurs on the propulsion power bus 106 or the non-critical bus 108.

Figure 2:
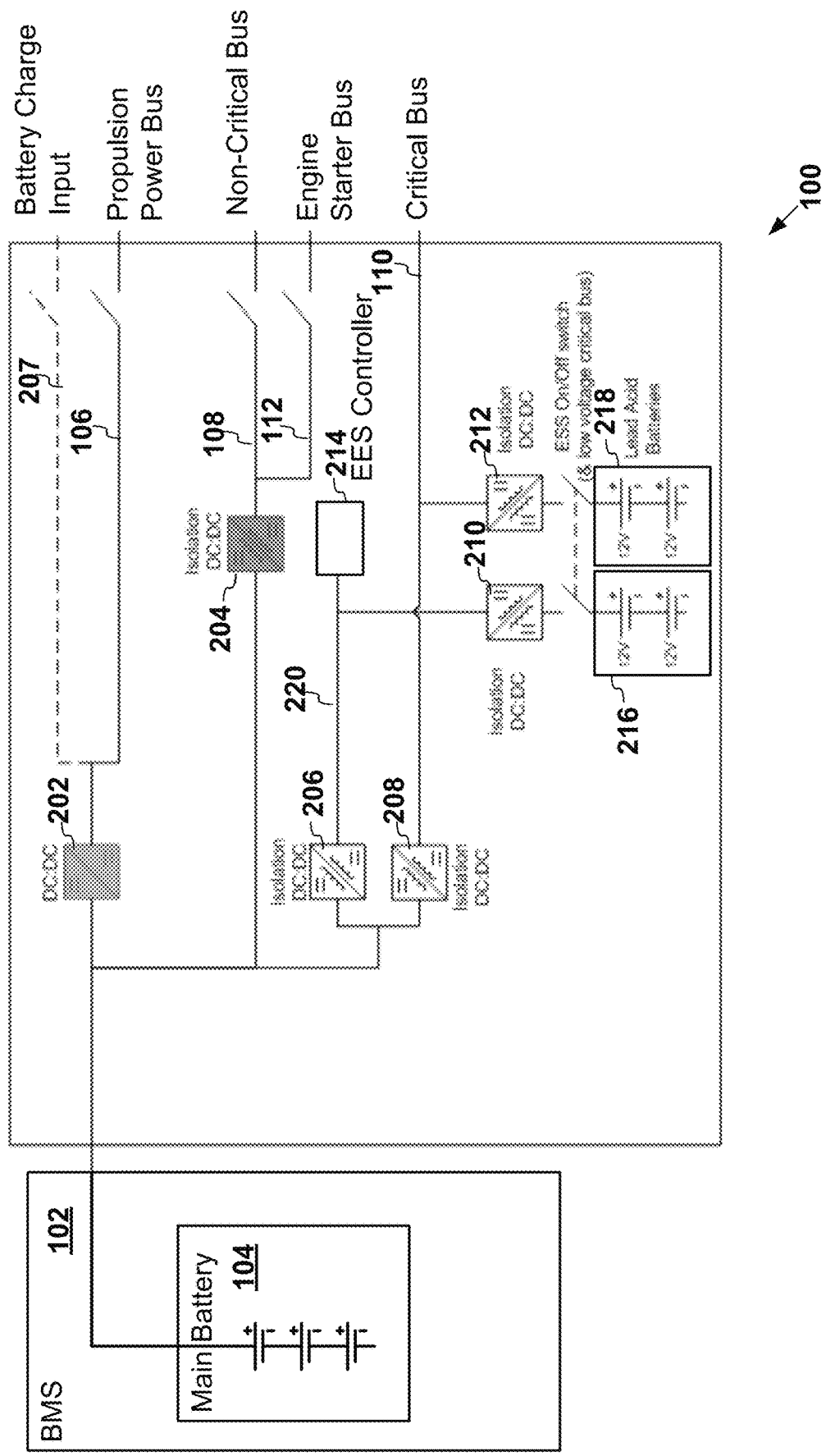
FIG. 2 illustrates a circuit diagram of an example of an electric circuit included in an energy storage system.

FIG. 2 illustrates a circuit diagram of an example of an electric circuit included in the energy storage system 100 for the aircraft. The system 100 illustrated in FIG. 2 includes the battery management system 102, the propulsion power bus 106, a battery charge input 207 to receive a charge from a ground-based charger (not shown), the non-critical bus 108, the engine starter bus 112, and the critical bus 110. In addition, the system 100 illustrated in FIG. 2 includes a first DC-DC converter 202 for the propulsion power bus 106 and the battery charge input 107, a second DC-DC converter 204 for the non-critical bus 108 and the engine starter bus 112, a third DC-DC converter 206 for an energy storage system controller 214 (ESS controller), a fourth DC-DC converter 208 for the critical bus 110, a fifth DC-DC converter 210 for supplying backup battery power to the ESS controller 214, a sixth DC-DC converter 212 for supplying backup battery power to the critical bus 110, and two corresponding backup batteries 216 and 218.

The first DC-DC converter 202 may be configured to convert a DC power signal from the main battery 104 to a predetermined target voltage on the propulsion power bus 106. The predetermined target voltage may be a fixed voltage such as 600 volts or any other voltage suitable to power the electric propulsion machine 114. In addition, the DC-DC converter 202 may be configured to convert a DC power signal received on the battery charge input 207 to a voltage suitable for charging the main battery 104.

The second DC-DC converter 204 may be configured to convert a DC power signal from the main battery 104 to a predetermined target voltage on the non-critical bus 108 and/or the engine starter bus 112. The predetermined target voltage may be a fixed voltage such as 28 volts or any other voltage suitable to power the electric starter 120 and/or the hotel load 116. By including contactors or switches in the system 100, the second DC-DC converter 204 may supply the converted DC power signal selectively to the non-critical bus 108, the engine starter bus 112, or both depending on the manner in which the ESS controller 214 controls the contactors or the switches. In alternative examples, the system 100 may include a DC-DC convertor for the non-critical bus 108 and another DC-DC converter for the engine starter bus 112 instead of the two busses sharing the second DC-DC converter 204.

The third DC-DC converter 206 may be configured to convert a DC power signal from the main battery 104 to a predetermined target voltage for the energy storage system controller 214. The predetermined target voltage may be a fixed voltage such as 24 volts or any other voltage suitable to power the ESS controller 214 over a line 220, which may also be referred to as an internal energy storage control bus.

The fourth DC-DC converter 208 may be configured to convert a DC power signal from the main battery 104 to a predetermined target voltage for the critical bus 110. The predetermined target voltage may be a fixed voltage such as 24 volts or any other voltage suitable to power the critical load 118.

The fifth DC-DC converter 210 may be configured to supply power from the first backup battery 216 to the ESS controller 214 if the voltage on the line 220 to power the ESS controller 214 drops below a threshold voltage, such as 22 volts, for example. The threshold voltage may be less than or equal to the predetermined target voltage that the third DC-DC converter 206 targets on the line 220 to the ESS controller 214. If the voltage on the line 220 drops below the threshold voltage, it may be an indication that the main battery 104 is failing to provide adequate power to the ESS controller 214 and/or the main battery 104 has not yet been started and is not yet able to provide adequate power to the ESS controller 214. In such a scenario, the first backup battery 216 may supply power to the ESS controller 214 via the fifth DC-DC converter 210. The first backup battery 216 may also be referred to as a control battery. The control battery may not be expected to provide power once the main battery 104 is started or initialized.

The sixth DC-DC converter 212 may be configured to supply power from the second backup battery 218 to the critical bus 110 if the voltage on the critical bus 110 drops below a threshold voltage, such as 22 volts. The threshold voltage may be less than or equal to the predetermined target voltage that the fourth DC-DC converter 208 targets on the critical bus 110. If the voltage on the critical bus 110 drops below the threshold voltage, it may be an indication that the main battery 104 is failing to provide adequate power to the critical bus 110 and/or the main battery 104 has not yet been started and is not yet able to provide adequate power to the critical bus 110. In such a scenario, the second backup battery 218 may supply power to the critical bus 110 via the sixth DC-DC converter 212.

The second DC-DC converter 204, the third DC-DC converter 206, the fourth DC-DC converter 208, the fifth DC-DC converter 210, and the sixth DC-DC converter may be isolated DC-DC converters. An isolated DC-DC converter is a converter in which an input of the converter is electrically isolated from an output of the converter. For example, the isolated DC-DC converter may include a transformer that isolates the input from the output. Examples of isolated DC/DC converters may include regulated, unregulated, and semi-regulated converters. The isolated DC-DC converter may include a feedback circuit that enables the converter to generate a target voltage at the output of the converter.

The main battery 104 may comprise a battery pack, a lithium ion battery, a lithium ion battery stack, a supercapacitor, a fuel cell system, an electrochemical cell, a lithiummetal battery, a lithium-air battery, and/or any other type of battery or combination of batteries. The battery management system 102 may include a controller interface (not shown) through which the ESS controller 214 may control the main battery 104. Each of the backup batteries 216 and 218 may include a lead acid battery, a lithium ion battery, and/or any other type of battery or combination of batteries.

The ESS controller 214 may include an application specific integrated circuit (ASIC), a digital signal processor, a field programmable gate array (FPGA), a digital circuit, an analog circuit, a controller, a microcontroller, a computing device, any other type of processor, or any combination thereof. The ESS controller 214 includes at least some hardware even if the included hardware comprises software.

The electric starter 120 may include any electric machine configured to mechanically rotate a rotor of the gas turbine engine 122. In some examples, the electric starter 120 may also operate as a generator, and may generate power for non-critical bus 108 after the gas turbine engine 122 starts up.

The gas turbine engine 122 may take a variety of forms in various embodiments. For example, the gas turbine engine 122 may be an axial flow engine. The gas turbine engine 122 may have multiple spools and/or may be a centrifugal or mixed centrifugal/axial flow engine. In some forms, the gas turbine engine 122 may be a turboprop, a turbofan, or a turboshaft engine. Furthermore, the gas turbine engine 122 may be an adaptive cycle and/or variable cycle engine. Other variations are also contemplated.

The gas turbine engine 122 may include, for example, an intake section, a compressor section, a combustion section, a turbine section, and an exhaust section. During operation of the gas turbine engine 122, fluid received from the intake section, such as air, may be compressed within the compressor section. The compressed fluid may then be mixed with fuel and the mixture may be burned in the combustion section. The combustion section may include any suitable fuel injection and combustion mechanisms. The hot, high pressure fluid may then pass through the turbine section to extract energy from the fluid and cause a turbine shaft of a turbine in the turbine section to rotate, which in turn drives the compressor section. Discharge fluid may exit the exhaust section.

As noted above, the hot, high pressure fluid passes through the turbine section during operation of the gas turbine engine 122. As the fluid flows through the turbine section, the fluid passes between adjacent blades of the turbine causing the turbine to rotate. The rotating turbine may turn a shaft that powers the compressor.

Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle.

The system 100 may be implemented in many different ways. The system 100 may include additional, fewer, and/or different components than illustrated. For example, instead of having the first and second backup batteries 216 and 218, the system 100 may include a single backup battery that may be used to provide backup power to the critical bus 110 and the ESS controller 214. In such an example, a single DC-DC converter may replace the fifth and sixth DC-DC converters 210 and 212. As another example, instead of having the battery charge input 107 being a separate line from the propulsion power bus 106, a single bus may serve as both the battery charge input 107 and the propulsion power bus 106.

In still another example, the system 100 may include additional switches, contacts, fuses, and/or other electrical components than shown in FIGS. 1 and 2. Alternatively or in addition, in some examples, the propulsion power bus 106 may be designed as a variable voltage bus instead of a fixed voltage bus. In some examples, the system 100 may include one or more built-in absence of voltage meters (AVMs). By including a built-in AVM, the AVM may indicate to personnel interacting with the system 100 whether any bus, in particular, the propulsion power bus 106, is live and, therefore, may be a safety concern. For example, the electric circuit of the system 100 may include a connection between the built-in AVM and the propulsion power bus 106.

Figure 3:
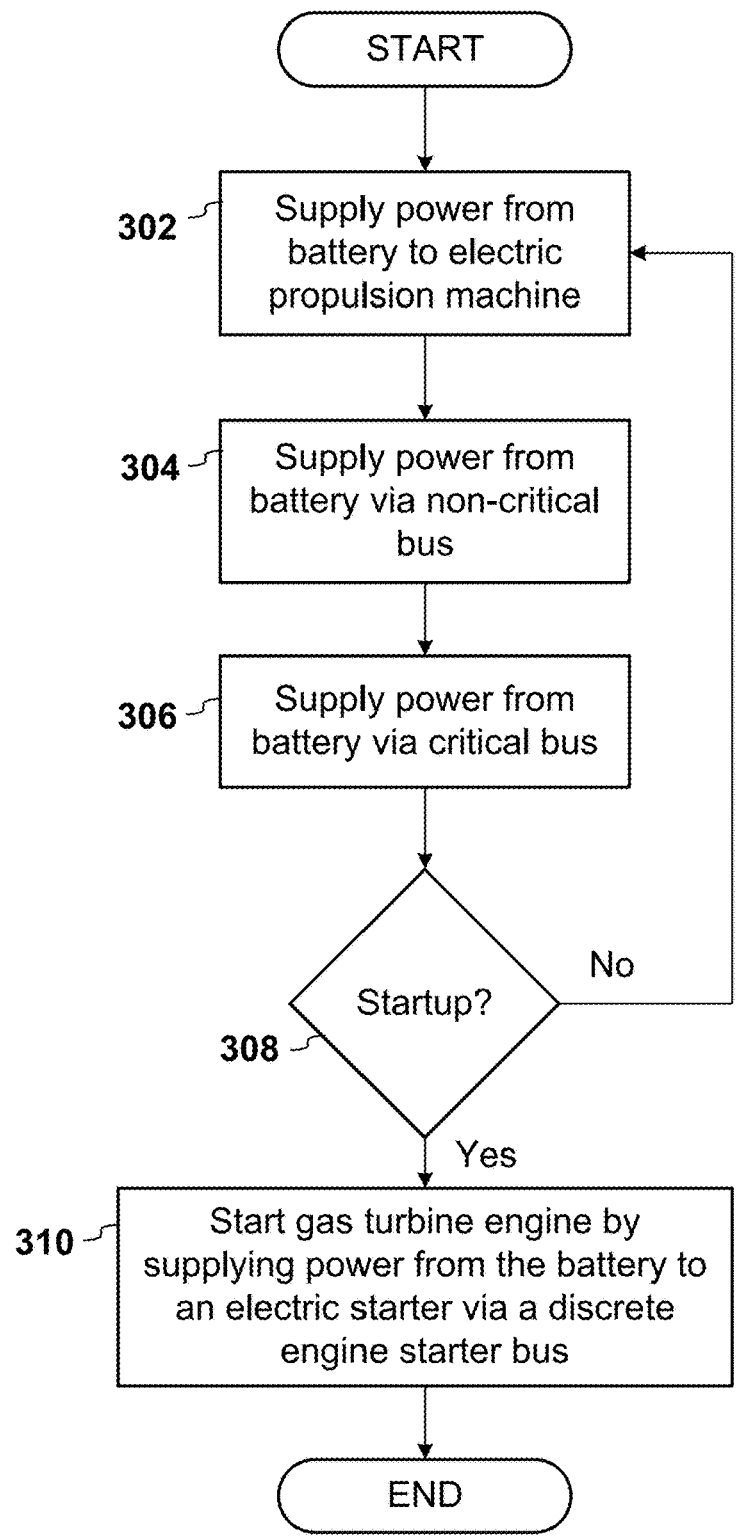
FIG. 3 illustrates a flow diagram of example operations performed by an energy storage system.

FIG. 3 illustrates a flow diagram of example operations performed by the energy storage system 100. The operations may include additional, different, or fewer operations than illustrated in FIG. 3. The steps may be executed in a different order than illustrated in FIG. 3.

Operation may be begin by supplying (302) electrical power from the main battery 104 to the electric propulsion machine 114 of the aircraft via the propulsion power bus 106. The electric propulsion machine 114 provides propulsion for the aircraft and the electric propulsion machine 114 is alternatively powered by the gas turbine engine 122.

Concurrently, electrical power may be supplied (304) from the main battery 104 to the hotel load 116 on the aircraft via the non-critical bus 108.

In addition, electrical power may be supplied (306) from the main battery 104 to the critical load 118 on the aircraft over the critical bus 110.

If a startup of the gas turbine engine 122 is determined (308) to be needed because, for example, a charge level of the main battery 104 drops below a threshold level, then the gas turbine engine 122 may be started (310) by providing electrical power from the main battery 104 to the electric starter 120 via the engine starter bus 112. The gas turbine engine 122 may power the electric propulsion machine 114 after the gas turbine engine 122 is started. For example, the gas turbine engine 122 may power a generator that generates electricity for the electric propulsion machine 114.

Alternatively, if the startup of the gas turbine engine 122 is not needed, then operations may continue by, for example, supplying (302) electrical power from the main battery 104 to the electric propulsion machine 114 of the aircraft via the propulsion power bus 106.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

What is claimed is:

1. An energy storage system for a hybrid aircraft, the energy storage system comprising:
   a main battery;
   a propulsion power bus configured to convey electricity, which is supplied by the main battery, to an electric propulsion machine comprising an electric motor configured to provide propulsion for the aircraft by being mechanically coupled to a propulsor via a driveshaft, the electric propulsion machine configured to also be electrically powered by a generator, which is powered by a gas turbine engine;
   a non-critical bus configured to convey electricity to a hotel load on the aircraft;
   a critical bus configured to convey electricity, which is supplied by the main battery, to a critical load on the aircraft; and
   an engine starter bus configured to convey electricity, which is supplied by the main battery, to an electric starter for the gas turbine engine.

2. The energy storage system of claim 1 further comprising an isolated DC-DC converter configured to transform a power signal from the main battery to a target fixed voltage on the engine starter bus.

3. The energy storage system of claim 1 further comprising a DC-DC converter configured to transform a power signal from the main battery to a target fixed voltage on the propulsion power bus.

4. The energy storage system of claim 1 further comprising an energy storage system controller, a first isolated DC-DC converter, a second isolated DC-DC converter, a first backup battery, and a second backup battery, wherein the first isolated DC-DC converter is configured to supply power from the first backup battery to the energy storage system controller, and wherein the second isolated DC-DC converter is configured to supply power from the second backup battery to the critical bus.

5. The energy storage system of claim 1 further comprising a controller and an isolated DC-DC converter, the controller configured to control the main battery and the isolated DC-DC converter configured to supply power from the main battery to the controller.

6. The energy storage system of claim 1 further comprising an isolated DC-DC converter configured to transform a power signal from the main battery to a target voltage on the critical bus.

7. The energy storage system of claim 1 wherein the main battery comprises a lithium ion battery.

8. An electric circuit of an energy storage system, the electric circuit comprising:
   a propulsion power bus configured to provide a power signal from a main battery to an electric propulsion machine, the electric propulsion machine comprising an electric motor configured to power a propulsor for a hybrid aircraft by being mechanically coupled to a propulsor via a driveshaft, the electric propulsion machine configured to also be electrically powered by a generator, which is powered by a gas turbine engine;
   a non-critical bus configured to provide electric power to a hotel load on the aircraft;
   a critical bus configured to provide electric power supplied by the main battery to a critical load on the aircraft; and
   an engine starter bus configured to provide electricity supplied by the main battery to an electric starter, the electric starter configured to startup the gas turbine engine.

9. The electric circuit of claim 8 further comprising an isolated DC-DC converter configured to transform a power signal from the main battery to a target fixed voltage on the engine starter bus.

10. The electric circuit of claim 8 further comprising a DC-DC converter configured to transform a power signal from the main battery to a target fixed voltage on the propulsion power bus.

11. The electric circuit of claim 8 further comprising an energy storage system controller, a first isolated DC-DC converter, a second isolated DC-DC converter, a first backup battery, and a second backup battery, wherein the first isolated DC-DC converter is configured to supply power from the first backup battery to the energy storage system controller, and wherein the second isolated DC-DC converter is configured to supply power from the second backup battery to the critical bus.

12. The electric circuit of claim 8 further comprising a controller and an isolated DC-DC converter, the controller configured to control the main battery and the isolated DC-DC converter configured to supply power from the main battery to the controller.

13. The electric circuit of claim 8 further comprising an isolated DC-DC converter configured to transform a power signal from the main battery to a target voltage on the critical bus.

14. The electric circuit of claim 8 wherein the main battery comprises a lithium ion battery.

15. A method comprising:
   supplying electrical power from a battery to an electric propulsion machine of a hybrid aircraft via a propulsion power bus, wherein the electric propulsion machine comprising an electric motor providing propulsion for the aircraft by turning a driveshaft mechanically coupled to a propulsor and the electric propulsion machine is alternatively powered by a generator, which is powered by a gas turbine engine;
   supplying electrical power from the battery to a hotel load on the aircraft via a non-critical bus;
   supplying electrical power from the battery to a critical load on the aircraft over a critical bus; and
   starting the gas turbine engine by providing electrical power from the battery to an electric starter via an engine starter bus, wherein the gas turbine engine powers the electric propulsion machine via the generator after the gas turbine engine is started.

16. The method of claim 15 further comprising transforming a power signal from the battery to a target fixed voltage on the engine starter bus.

17. The method of claim 15 further comprising transforming a power signal from the battery to a target fixed voltage on the propulsion power bus.

18. The method of claim 15 further comprising supplying power from a first backup battery to an energy storage system controller via a first isolated DC-DC converter, and supplying power from a second backup battery to the critical bus via a second isolated DC-DC converter.

19. The method of claim 15 further comprising controlling the battery with a controller that is powered by the battery via an isolated DC-DC converter.

* * * * *